United States Patent
Høyland et al.

(10) Patent No.: US 11,984,762 B2
(45) Date of Patent: May 14, 2024

(54) ELECTRIC MACHINE STATOR TUBE

(71) Applicant: Rolls-Royce Electrical Norway AS, Trondheim (NO)

(72) Inventors: Jørg Høyland, Trondheim (NO); Roar Furuhaug, Trondheim (NO); Tina Skare Pryde, Trondheim (NO); Torbjørn Moi, Trondheim (NO)

(73) Assignee: Rolls-Royce Electrical Norway AS, Trondheim (NO)

( * ) Notice: Subject to any disclaimer, the term of this patent is extended or adjusted under 35 U.S.C. 154(b) by 99 days.

(21) Appl. No.: 17/449,881

(22) Filed: Oct. 4, 2021

(65) Prior Publication Data

US 2023/0108862 A1    Apr. 6, 2023

(51) Int. Cl.
  *H02K 1/18*   (2006.01)
  *H02K 1/20*   (2006.01)
  *B64D 27/24*  (2006.01)

(52) U.S. Cl.
  CPC .............. *H02K 1/185* (2013.01); *H02K 1/20* (2013.01); *B64D 27/24* (2013.01)

(58) Field of Classification Search
  CPC ........... H02K 5/161; H02K 1/20; H02K 1/185
  USPC ...................................................... 310/86, 85
  See application file for complete search history.

(56) References Cited

U.S. PATENT DOCUMENTS

| | | | |
|---|---|---|---|
| 2,698,911 A * | 1/1955 | Schaefer .............. | H02K 5/1285 310/86 |
| 2,798,173 A * | 7/1957 | Penlington .......... | H02K 5/1285 310/86 |
| 7,208,854 B1 | 4/2007 | Saban et al. | |
| 8,253,298 B2 * | 8/2012 | Saban ...................... | H02K 3/28 310/216.069 |
| 8,378,550 B2 | 2/2013 | Bradfield | |
| 2009/0026878 A1 * | 1/2009 | Hansen ............... | F04D 13/0633 310/272 |
| 2012/0013207 A1 | 1/2012 | Chamberlain et al. | |
| 2013/0224048 A1 * | 8/2013 | Gillingwater .......... | H02K 5/128 417/372 |
| 2016/0172923 A1 * | 6/2016 | Claycomb .............. | H02K 5/128 310/86 |

FOREIGN PATENT DOCUMENTS

| | | | |
|---|---|---|---|
| CN | 109450128 B | 6/2020 | |
| DE | 102009034158 A1 * | 2/2011 | ............. H02K 5/128 |
| GB | 538358 A * | 7/1941 | |

OTHER PUBLICATIONS

Joeckel (DE 102009034158 A1) English Translation (Year: 2011).*

* cited by examiner

*Primary Examiner* — Tulsidas C Patel
*Assistant Examiner* — Robert E Mates
(74) *Attorney, Agent, or Firm* — Shumaker & Sieffert, P.A.

(57) ABSTRACT

An example stator tube assembly includes a hollow body defining a cavity and having a longitudinal length and a radial thickness. The hollow body is configured to be disposed within a stator housing and to separate the cavity from a stator cavity within the stator housing. The hollow body comprises a first radial thickness along a first portion of its longitudinal length and a second radial thickness along a second portion of its longitudinal length, the second radial thickness being greater than the first radial thickness.

4 Claims, 11 Drawing Sheets

ELECTRIC MACHINE STATOR TUBE

TECHNICAL FIELD

This disclosure relates to electric machines.

BACKGROUND

Electric machines convert between electrical energy and mechanical energy. As one example, an electric machine may operate as a generator that converts mechanical energy into electrical energy. As another example, an electric machine may operate as an electrical motor that converts electrical energy into mechanical energy. Electric machines typically include a rotor that rotates within a stator. Energy flows through the stator to or from the rotor. In an electric motor, the stator provides a rotating magnetic field that drives the rotor. In a generator, the stator converts a rotating magnetic field to electric energy.

SUMMARY

In one example, this disclosure describes a stator tube assembly including: a hollow body defining a cavity and having a longitudinal length and a radial thickness, wherein the hollow body is configured to be disposed within a stator housing and to separate the cavity from a stator cavity within the stator housing, wherein the hollow body comprises a first radial thickness along a first portion of its longitudinal length and a second radial thickness along a second portion of its longitudinal length, the second radial thickness being greater than the first radial thickness.

In another example, this disclosure describes a support ring including: at least one of a metal or a polymer composite configured to be disposed within a cavity defined by a stator tube and adjacent to an inner surface of the stator tube along a portion of a longitudinal length of the stator tube for at least a portion of a circumference of the stator tube, wherein the support ring is configured to increase a buckle resistance of the stator tube, wherein the stator tube is configured to be inserted into a stator housing and to separate the cavity from a stator cavity within the stator housing.

In another example, this disclosure describes a method of making an electric machine including: inserting a stator tube assembly into a stator housing, the stator tube assembly including: a hollow body defining the rotor cavity and having a longitudinal length and a radial thickness, wherein the hollow body is configured to be disposed within the stator housing and to separate the rotor cavity from the stator within the stator housing, wherein the hollow body comprises a first radial thickness along a first portion of its longitudinal length and a second radial thickness along a second portion of its longitudinal length, the second radial thickness being greater than the first radial thickness.

The details of one or more examples are set forth in the accompanying drawings and the description below. Other features, objects, and advantages will be apparent from the description and drawings, and from the claims.

DETAILED DESCRIPTION

Figure 1:
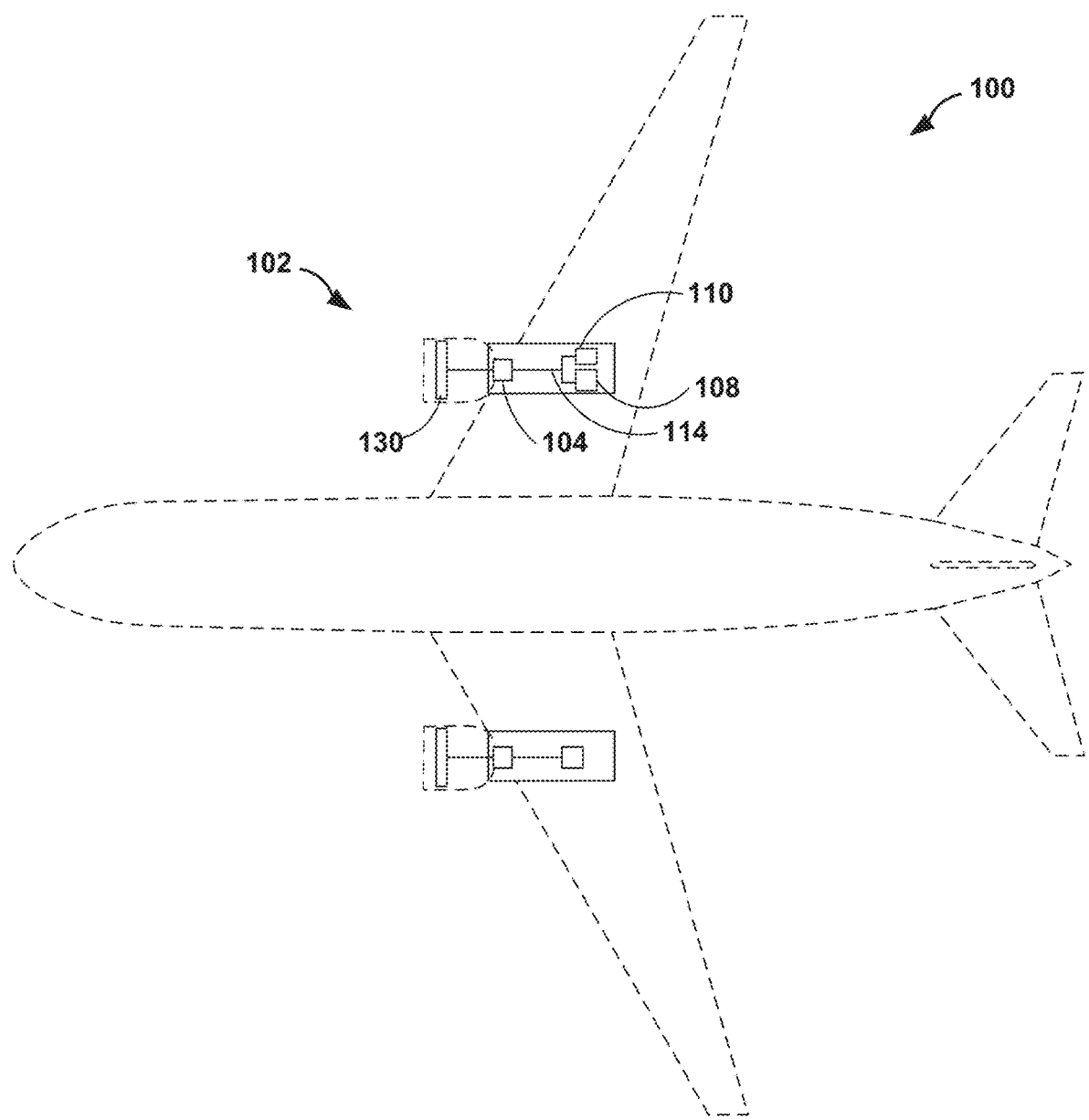
FIG. 1 is a conceptual diagram of a vehicle that includes an electric machine.

Electric machines may be used to provide energy to, or extract energy from, rotating devices. As one example, an electrical generator may convert rotational mechanical energy extracted from a combustion motor into electrical energy. As another example, an electrical motor may provide rotational mechanical energy to assist with starting a combustion motor. As another example, an electrical motor may provide rotational mechanical energy to drive a propulsor (e.g., fan, propeller, etc.) of a vehicle. An electric machine may operate in various modes at different times. For instance, a particular electric machine may operate as a starter to start a combustion motor at a first time and operate as a generator to convert rotational mechanical energy generated by the combustion motor into electrical energy at a second time. In this way, an electric machine may operate as an electrical starter-generator.

An electric machine may include a rotor that rotates relative to a stator. The rotor may include magnets, e.g., permanent magnets (PMs), disposed around a cylindrical body of the rotor. Magnetic fields of the magnets of the rotor interact with magnetic fields generated by windings included in the stator to transfer energy. The stator may transfer energy to, or receive energy from, the rotor via interaction between magnetic fields generated by the stator windings and magnetic fields generated by the rotor. For example, an alternating current may be applied to the stator windings in a motor which may cause alternating magnetic fields. Interaction between magnetic fields generated by the magnets of the rotor and the alternating magnetic fields may transfer and convert the electrical energy in the stator windings to mechanical motion (e.g., rotation) of the rotor. Similarly, rotation of the rotor in a generator may cause alternating magnetic fields which may transfer and convert the mechanical energy of the motion of the rotor to electrical energy in the stator windings via induction of a current in the windings by the alternating magnetic fields.

Electric machines have energy losses in transferring energy between rotation mechanical energy and electrical energy or from electrical energy to rotational mechanical energy. For example, stator conductors include resistance which converts electrical energy to heat the increases the temperature of the stator conductors/coils, air or fluid friction resists the motion of the rotor and produces heat, and the alternating magnetic fields may induce eddy currents in conductors that are within the magnetic fields, such as the magnets and the rotor sleeve of the rotor which have electrical resistance converting electrical energy to heat increasing the temperature of the magnets and sleeve. Electric machines may have further losses as well, losses which ultimately are converted to heat which increases the temperature of the components of the machine, which may then change the performance and characteristics of the electric machine and/or degrade components of the electric machine.

Electrical machines may be configured to cool portions of the electrical machine via a circulating fluid, such as air, water, cooling oils, and the like. For example, energy losses manifesting as heat in the stator may be cooled by circulating a cooling oil within the stator. The cooling oil may contact the stator housing, lamination stack (e.g., steel lamination) and conductors/coils and heat may be conductively transferred to the cooling oil.

Such cooling fluids, such as cooling oils, may be separated from the rotor and/or moving part of the electric machine. For example, a fluid may increase friction resisting the motion of the rotor. An electric machine may include a stator tube (or stator can) configured to contain a cooling fluid within a stator portion, or stator cavity, of the electric machine and allow the rotor to rotate in air, or other relatively low friction gas or fluid. The stator tube may be positioned in a space between the stator conductors/coils and the rotor (or rotors).

In some instances, including a stator tube may result in a greater distance between the stator conductors/coils and the rotor, e.g., due to the thickness of the stator tube and any additional distance needed to account for thickness variations due to manufacturing and expansion of components while the electric machine is in use. This distance, or gap, between rotor (e.g., magnets of the rotor) and stator conductors/coils directly affects the compactness of the machine and the efficiency of the transfer of mechanical and electrical energy via proximity of the magnets on the rotor assembly to the conductors of the stator, e.g., a lower gap leads to more efficient energy transfer. It is often desired to reduce and/or minimize the thickness of the stator tube in order to reduce the overall size (e.g., increase the compactness) of the electric machine.

However, there may be limits to the thickness, or equivalently the thinness, of the stator tube. For example, the stator tube may be configured to contain a higher density, higher pressure fluid (e.g., a cooling oil) within a stator cavity/portion that is radially outwards from the stator tube and separate from a lower density, lower pressure fluid (e.g., air) within a cavity radially within, and at least partially defined by, the stator tube, e.g., a rotor portion. The higher pressure fluid may be in contact with a radially outwards surface (e.g., the outer surface) of the stator tube and the lower pressure fluid may be in contact with a radially inwards surface (e.g., the inner surface) of the stator tube. In other words, there may be a force imbalance with the higher pressure fluid exerting a radially inwards force on the outer surface of the stator tube that is greater than the radially outwards force exerted on the inner surface of the stator tube by the lower pressure fluid. If the force imbalance is greater than what the stiffness of the stator tube can bear (e.g., a buckling resistance of the stator tube), the stator tube may buckle and move radially inwards which may interfere with the rotor, or ultimately the stator tube may structurally fail (e.g., rip, tear, break, pull loose from a fitting at one or both ends) and the higher pressure fluid within the stator portion may leak or enter the rotor portion cavity. The stator tube stiffness, and buckle resistance, is directly proportional to its thickness, with a thicker stator tube being stiffer and more buckle resistant than a thinner stator tube.

Figure 4:
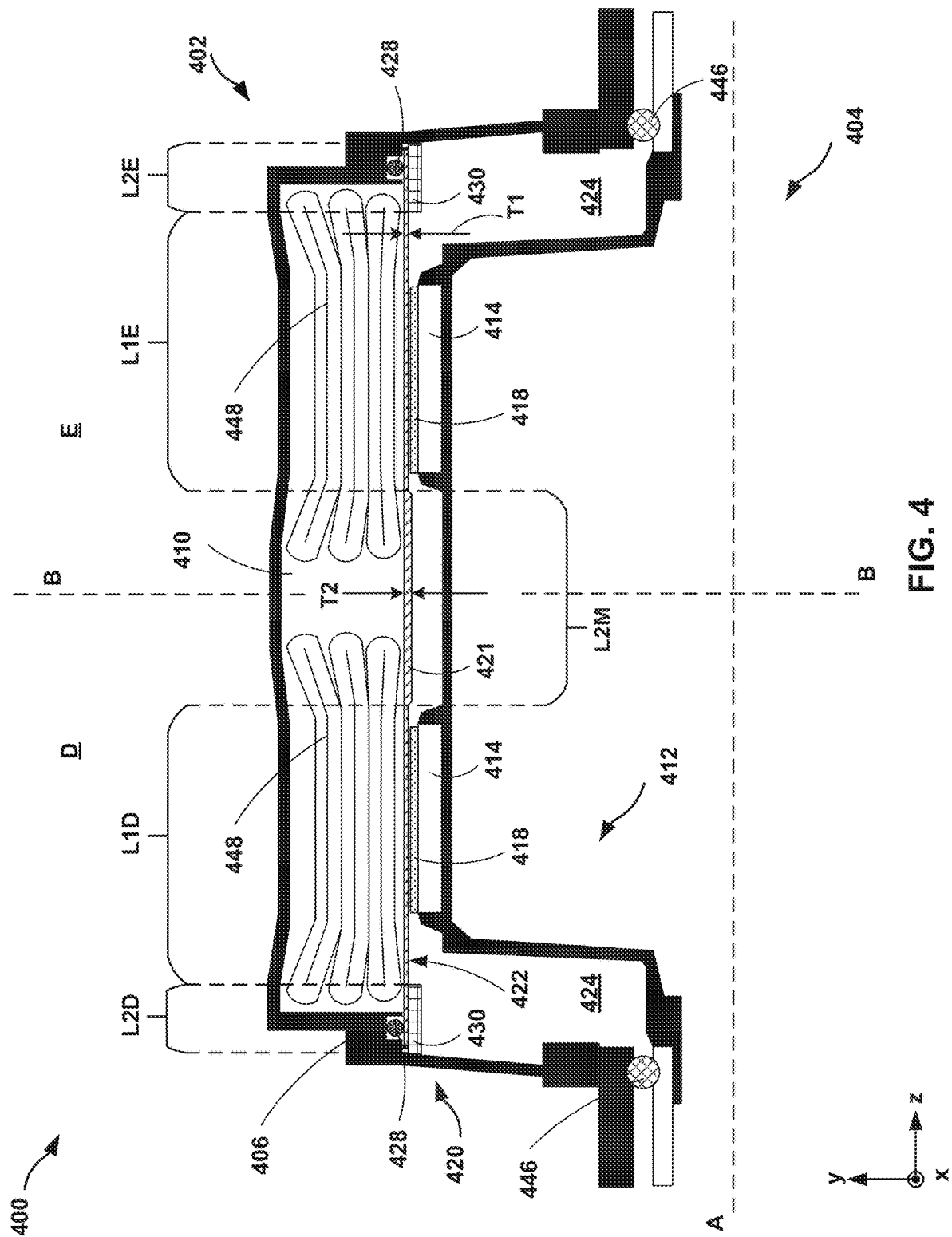
FIG. 4 is a cross-sectional view of a portion of an example stator tube within a stator housing.

In accordance with one or more techniques of this disclosure, a stator tube assembly includes a hollow body defining has a longitudinal length and a radial thickness and is configured to be disposed within a stator housing to separate the cavity (e.g., the rotor portion) from a stator cavity within the stator housing, e.g., a stator cavity including stator windings. The hollow body (alternatively referred to as a stator tube) includes a first thickness along a first portion of its longitudinal length and a second radial thickness along a second portion of its longitudinal length, where the second radial thickness is greater than the first radial thickness. For example, the hollow body may be thicker in non-active portions of the longitudinal length of the electric machine where there are no magnets and/or conductive coils. In some examples, the hollow body may include a portion of longitudinal length that extends beyond where the magnets of the rotor and/or conductors of the stator end, allowing room for a thicker hollow body, and the hollow body may be thicker at those ends thereby increasing the stiffness along those portions which may extend to increase the buckling resistance of the hollow body. In some examples, the magnets of the rotor and conductors of the stator may be disposed along portion of the longitudinal length of the electric machine, and not the entire length, e.g., as illustrated in FIG. 4 in which there is a middle portion of the longitudinal length without magnets/coils. The hollow body may have an increased thickness at the middle portion, thereby increasing the stiffness along the middle portion and which may extend to increase the buckling resistance of the hollow body. In some examples, one or more portions, e.g., one or both ends and/or a middle portion, of the longitudinal length of the hollow body may have an increased thickness.

In some examples, the increased thickness of the hollow body may be integral with the hollow body, e.g., the material of the hollow body may have varying thicknesses along its longitudinal length. In other examples, the hollow body thickness may comprise an additional component attached to, or adjacent or near to a surface of the hollow body. For example, the stator tube assembly may include a hollow body having a constant thickness along its longitudinal length, or a varying thickness, and the stator tube assembly may include a support ring configured to be disposed within the cavity defined by the hollow body and configured to increase a buckle resistance of the hollow body.

In some examples, the buckling resistance of the stator tube assembly may be improved by reinforcing one or both of the longitudinal ends of the stator tube assembly, e.g., via an increased radial thickness of the hollow body at the ends, or by including a support structure such as a support ring, or both. In the case of increasing the radial thickness of the hollow body at one or both ends of the stator tube assembly, the radially thicker ends may make assembly of the electric machine more difficult, e.g., manufacturing the hollow body with a varying thickness and/or inserting the stator tube assembly into the stator housing may be more difficult. As such, in some examples, the hollow body may have a relatively constant radial thickness along its longitudinal length, and a support ring may be included at one or both ends of the hollow body.

In some examples, the support ring may provide extra stiffness to the hollow body and thereby increase the buckling resistance of the stator tube assembly and/or the hollow body. Additionally, the support ring may include a stop edge to properly seat the hollow body within the stator housing, and the support ring (or support rings) may be configured to allow fluid to drain from the cavity, e.g., the rotor portion. For example, the support ring may include one or more channels configured to be in fluid communication between the cavity and a drainage slot of the stator housing.

In some examples, the support ring may allow the stator tube assembly to have a reduced radial thickness, thereby enabling the electric machine to have an improved compactness and improving assembly of the electric machine. For example, a first support ring may be press fit, or interference fit, into the cavity at one end of the hollow body, and the hollow body and support ring may then be inserted into and end of the stator housing via a press fit, or interference fit. A rotor assembly may then be inserted into the cavity defined by the hollow body. A second support ring may then be press fit, or interference fit, into the other end of the hollow body via a press fit, or interference fit. In another example, a first support ring may be positioned within a first end lid of the stator housing, and the hollow body may then be inserted between at least a portion of the stator housing and the first support ring via a press fit, or interference fit. The rotor assembly may then be inserting into the cavity defined by the hollow body. A second support ring may then be inserted into a second end lid of the stator housing, and the hollow body may be inserted between at least a portion of the stator housing and the second support ring via a press fit, or interference fit.

FIG. 1 is a conceptual diagram of a vehicle 100 that includes an electric machine, in accordance with one or more techniques of this disclosure. In some examples, vehicle 100 is an aircraft. In other examples, vehicle 100 may include any type of vehicle utilizing an electric machine, including one or more types of air vehicles; land vehicles, including but not limited to, tracked and/or wheeled vehicles; marine vehicles, including but not limited to surface vessels, submarines, and/or semi-submersibles; amphibious vehicles; or any combination of one or more types of air, land, and marine vehicles. Vehicle 100 may be manned, semiautonomous, or autonomous.

As shown in the example of FIG. 1, vehicle 100 may include propulsion system 102. In some examples, propulsion system 102 may include a combustion engine, such as a gas-turbine engine. Propulsion system 102 includes motor 104 that is configured to drive propulsor 130. Propulsion systems that include gas-turbine engines may include electric generator 108 that may both start the gas-turbine engines and generate electrical power using mechanical energy generated by the gas-turbine engines. As shown in FIG. 1, propulsion system 102 may include generator 108 and energy storage system (ESS) 110 coupled to electrical bus 114, and motor 104 coupled to electrical bus 114.

In accordance with one or more techniques of this disclosure, motor 104 and/or generator 108 may include a stator tube assembly comprising a hollow body defining a cavity, the hollow body having a longitudinal length and configured to be disposed within a stator housing and to separate the cavity from a stator cavity within the stator housing. The hollow body may have a first radial thickness along a first portion of its longitudinal length and a second radial thickness along a second portion of its longitudinal length, the second radial thickness being greater than the first radial thickness. For example, the hollow body may be substantially similar to stator tube assembly 420, illustrated and described below with reference to FIG. 4.

In some examples, motor 104 and/or generator 108 may include a metal or polymer composite support ring. The support ring may be configured to be disposed within a cavity defined by the hollow body and adjacent an inner surface of the hollow body along a portion of the longitudinal length of the hollow body for at least a portion of the circumference of the hollow body. The stator tube assembly may be configured to be inserted into a stator housing of motor 104 and/or generator 108 and to separate the cavity from a stator cavity within the stator housing, and the support ring may be configured to increase a buckle resistance of the hollow body and or stator tube assembly.

Figure 2:
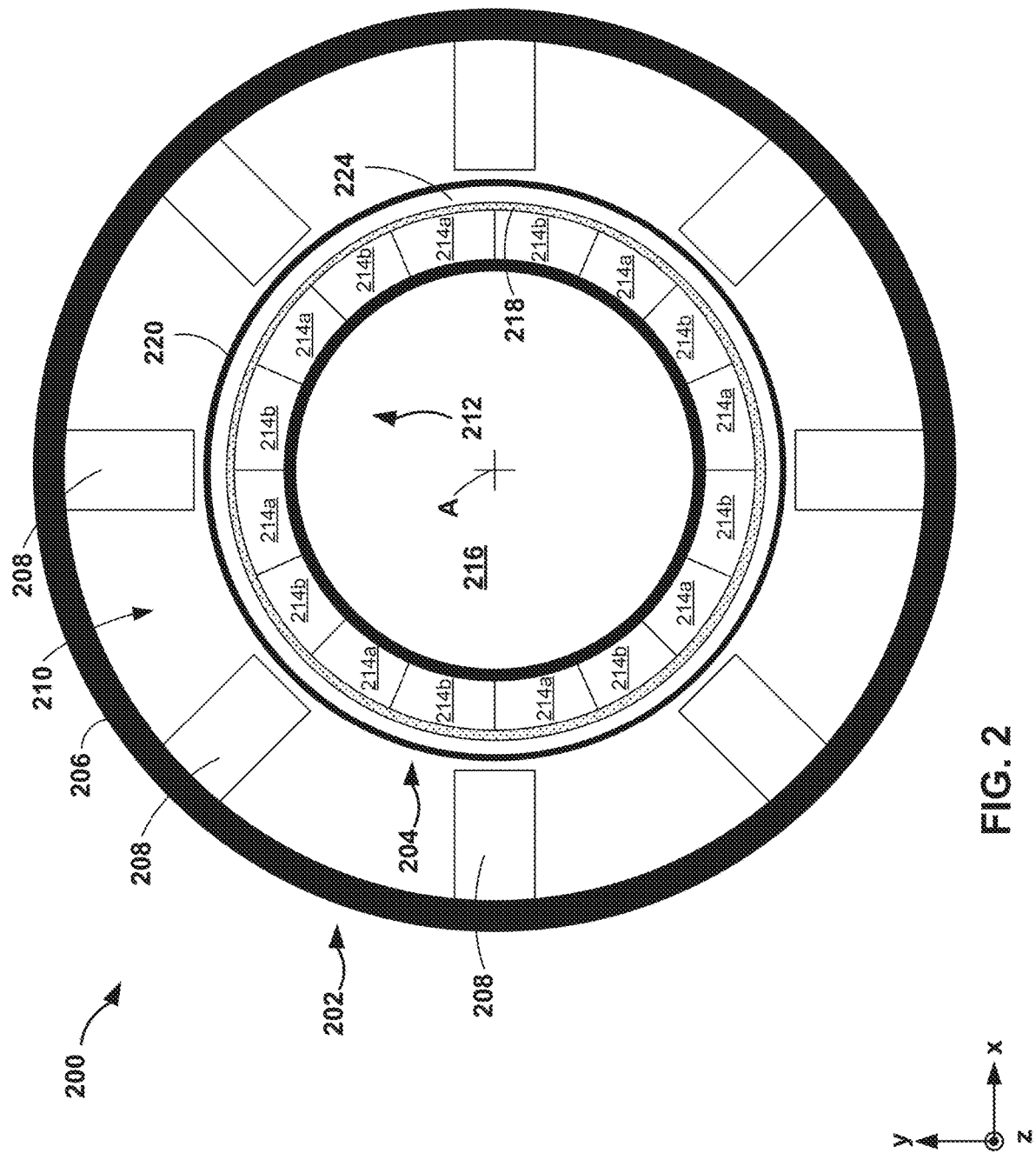
FIG. 2 is a cross-sectional view of an electric machine.

FIG. 2 is a cross-sectional view of an electric machine 200 as viewed along axis A, in accordance with one or more techniques of this disclosure. In some examples, the cross-sectional view may correspond to a cross section at the plane of circumference C illustrated in FIG. 3, with respect to electric machine 300. In the example shown, electric machine 200 includes stator 202, rotor assembly 204, and stator tube assembly 220. In some examples, electric machine 200 may be either, or both, of an electric generator configured to convert mechanical energy to electrical energy or an electric motor configured to convert electrical energy to mechanical energy.

In the example shown, stator 202 includes base portion 206 and a plurality of stator teeth 208. Stator teeth 208 may project radially inward towards longitudinal axis A of rotor assembly 204 from base portion 206. In some examples, the plurality of stator teeth 208 may be disposed circumferentially around longitudinal axis A, e.g., about the z-axis as illustrated. In some examples, stator 202 may have a length that is substantially the entire length of electric machine 200 and/or rotor assembly 204, e.g., along longitudinal axis A in the z-direction. In other examples, electric machine 200 may include a plurality of stators 202 disposed along a longitudinal axis A in the z-direction, each stator 202 having a length that is substantially less than the length of electric machine 200 and/or rotor assembly 204. In some examples, stator teeth 208 may define a plurality of slots 210 between stator teeth 208. A plurality of stator windings (not shown) may be wound around the plurality of stator teeth 208 and at least partially filling stator slots 210.

In the example shown, rotor assembly 204 includes rotor core 212, a plurality of magnet pairs 214a and 214b of opposite polarity (collectively referred to as magnets 214) disposed on or about the surface of rotor core 212, and sleeve 218. As used herein, magnets of the "same polarity" have their magnetic poles oriented in the same direction, and magnets of the "opposite polarity" have their magnetic poles oriented in opposite directions. Namely, magnets do not have a particular polarity, but rather an orientation of their magnetic poles. For ease of description, magnets described as having the "same polarity" or "opposite polarity" relative to each other as used herein means that the magnets are oriented with like poles (e.g., their magnetic north and south poles) oriented in the same direction or opposite direction, respectively, relative to each other. For example, the magnetic north and south poles of magnets 214a and 214b may be oriented opposite to each other such that the north magnetic pole of magnet 214a may be at the end of magnet 214a in the positive z-direction and its south magnetic pole may be at its end in the negative z-direction, and the opposite may be true for magnet 214b.

Sleeve 218 may be configured to secure magnets 214 to an outer surface of rotor core 212. In some examples, there may be one or more layers between the outer surface of rotor core 212 and magnets 214. For example, sleeve 218 may be configured to secure magnets 214 to an outer surface of one or more layers disposed on an outer surface of rotor core 212, e.g., an adhesive, a wrap, or any other material forming a layer between magnets 214 and the outer surface of rotor core 212. In some examples, sleeve 218 may comprise a metal, and in other examples sleeve 218 may comprise a composite material, e.g., a carbon fiber.

In some examples rotor core 212 may be a hollow shell and/or drum, e.g., volume 216 may be hollow. In some examples, rotor core 212 may be solid core, e.g., volume 216 may be a substantially solid material, e.g., a metal. In some examples, rotor core 212 may be and/or include a drive shaft, or rotor core 212 may be mechanically coupled to a drive shaft in other examples.

When electric machine 200 is operating as a generator, a torque may be applied to rotor assembly 204, e.g., via rotor core 212 as a drive shaft. The rotation of rotor assembly 204 may cause an alternating magnetic field at each of stator teeth 208 due to the rotation of the magnet pairs 214a and 214b. The alternating magnetic fields may induce a current, e.g., and alternating current (AC) to flow in the windings of stator 202, thereby converting the mechanical energy (rotation) of the rotor into electrical energy in the windings. When electric machine 200 is operating as a motor, the opposite conversion may occur. Namely, AC flowing through the windings of stator 202 may cause alternating magnetic fields, which interact with magnets 214 to induce a torque on rotor assembly 204 thereby converting the electrical energy in the windings to mechanical energy of the rotor assembly.

In some examples, the alternating magnetic fields may induce eddy currents in conductors located within the fields, e.g., magnets 214, sleeve 218, etc. Electrical resistance of the magnets 214 or sleeve 218, or any material in which eddy currents may be induced, may cause at least a portion of the energy coupled into the eddy currents to be converted to heat. Electric machine 200 may include other sources of heat, desired or undesired, as well. For example, air resistance and/or friction may convert rotational energy of rotor assembly 204 to heat, e.g., increasing the temperature of magnets 214 and/or other components of rotor assembly 204.

In accordance with one or more techniques of this disclosure, electric machine 200 may include stator tube assembly 220. Stator tube assembly 220 may define a cavity, e.g., cavity 224. In the example shown, rotor assembly 204 is configured to be disposed within, and to rotate within, cavity 224. Stator tube assembly 220 may be made of an electrically insulating material or a material having a relatively low electrical conductivity, e.g., a ceramic or ceramic fiber material, a glass or glass fiber material, a carbon fiber material, a composite material, and the like. In some examples, stator tube assembly 220 may have a first radial thickness along a first portion of its longitudinal length and a second radial thickness along a second portion of its longitudinal length, the second radial thickness being greater than the first radial thickness. In some examples, stator tube assembly 220 may include a metal or polymer composite support ring (not shown in FIG. 2), e.g., support ring 430 illustrated and described below with reference to FIG. 5. The support ring may be configured to be disposed within the cavity defined by stator tube assembly 220 and adjacent an inner surface of stator tube assembly 220 along a portion of the longitudinal length of stator tube assembly 220 and for at least a portion of the circumference of stator tube assembly 220. Stator tube assembly 220 may be configured to be inserted into stator 202, e.g., into base portion 206, and stator tube assembly 220 may be configured to separate cavity 224 from stator 202, e.g., a volume including stator teeth 208, stator slots 210, and stator windings disposed within base portion 206. The support ring and/or second radial thickness greater than the first radial thickness may be configured to increase a buckle resistance of stator tube assembly 220. In some examples, stator tube assembly 220 may include either a support ring or a second radial thickness greater than the first radial thickness, and in other examples, stator tube assembly 220 may include both a support ring or a second radial thickness greater than the first radial thickness.

Figure 3:
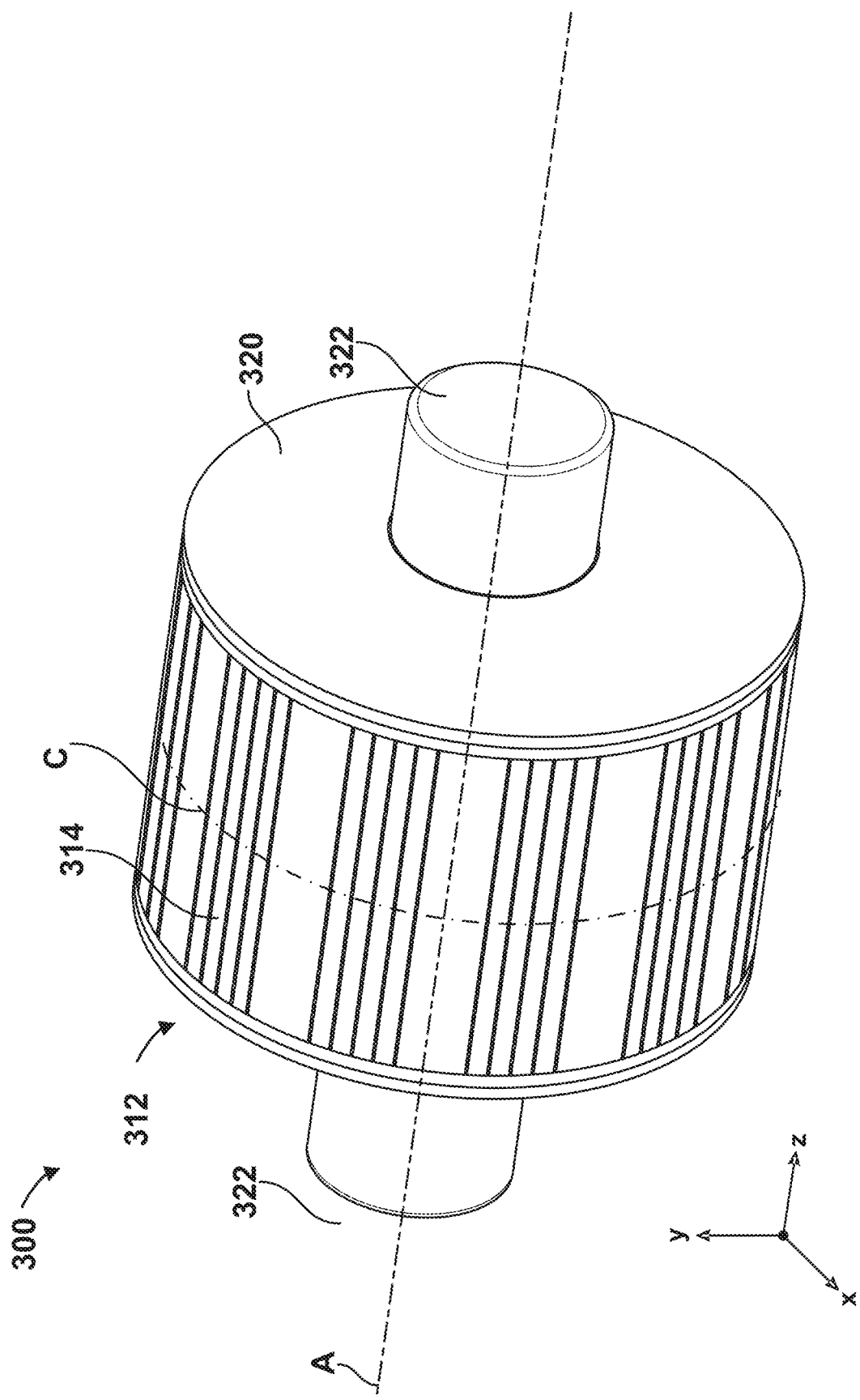
FIG. 3 is a perspective view of a rotor assembly.

FIG. 3 is a perspective view of a rotor assembly 300, in accordance with one or more techniques of this disclosure. In the example shown, rotor assembly 300 includes rotor shaft 322, rotor core 312, permanent magnets 314.

Rotor shaft 322 is configured to support rotor core 312 and contact one or more bearings to rotate about longitudinal axis A. Rotor shaft 322 is made of a hard material, e.g., a metal, and has a smooth surface finish at least in the areas that contact one or more bearings so as to minimize friction and/or resistance to rotation. In some examples, rotor shaft 322 may be integral with, or a part of, rotor core 312.

Rotor core 312 is configured to support permanent magnets 314 at a radial distance from axis A, e.g., so as to efficiently interact with a stator via alternating magnetic fields (either as a generator or motor). Rotor core 312 is configured to rotate within a cavity defined by a stator tube (not visible in FIG. 3), e.g., stator tube assembly 220 of FIG. 2 or stator tube assembly 420 of FIG. 4.

FIG. 4 is a cross-sectional view of a portion of an example electric machine 400, in accordance with one or more techniques of this disclosure. The cross-sectional view shown is of a portion of rotor assembly 400 as viewed in the radial direction. It should be appreciated that the view shown in FIG. 4 may be a portion of rotor assembly 400 that may be symmetric about axis A, e.g., a portion of the "top half" of rotor assembly 400.

In the example shown, stator 402 includes stator housing 406 and conductors 448. Conductors 448 may be stator windings, e.g., wound around a plurality of stator teeth (not shown). Stator housing 406 may be configured to both support conductors 448 and position conductors 448 at a radial distance from permanent magnets 414 of rotor assembly 404. In some examples, stator housing 406 may be configured to contain a fluid within stator cavity 410, e.g., in conjunction with stator tube assembly 420. In other words, stator housing 406 and stator tube assembly 420 are configured to define stator cavity 410. In some examples, the fluid may be a cooling oil, air, water, a gas, a refrigerant, and the like, and stator housing 406 and stator tube assembly 420 may be configured to contain a fluid within stator cavity 410. In some examples, stator housing 406 may include one or more fluid inlets and one or more fluid outlets configured to allow the fluid to move within stator cavity 410 and enter and/or leave stator cavity 410.

Stator housing 406 is configured to house rotor assembly 404. For example, rotor assembly 404 is configured to rotate within stator 402, e.g., via bearings 446 between stator housing 406 and rotor assembly 404. In the example shown, rotor assembly 404 is configured to rotate within rotor cavity 424 defined by stator 402 and to rotate about longitudinal axis A.

In the example shown, rotor assembly 404 includes rotor core 412, a plurality of magnets 414 disposed on or about the surface of rotor core 412, and sleeve 418. Magnets 414 and sleeve 418 may be substantially similar to magnets 214 and sleeve 218 described above.

In the example shown, electric machine 400 includes stator tube assembly 420. Stator tube assembly 420 includes hollow body 421 and, optionally, support rings 430. Stator tube assembly 420 may be substantially similar to stator tube assembly 220 of FIG. 2. Hollow body 221 defines rotor cavity 424 and is configured to separate rotor cavity 424 from stator cavity 410, e.g., mechanically and/or fluidically. For examples, stator tube assembly 420 is configured to prevent, eliminate, or reduce fluid communication between rotor cavity 424 and stator cavity 410. Hollow body 221 and support rings 430 may be made of an electrically insulating material or a material having a relatively low electrical conductivity, e.g., a ceramic or ceramic fiber material, an aluminum-oxide ceramic, a glass or glass fiber material, a carbon fiber material, an epoxy or epoxy matrix, a resin, a composite including any or all of the above materials and additional plastics, polymers, resins, epoxies, and the like. In some examples, support rings 430 may be made of an electrically conducting material, e.g., a metal. For example, if support rings 430 are longitudinally positioned away from magnets 414 and conductors 448, the interaction between support rings 430 and magnetic fields of magnets 414 and conductors 448 may be acceptable, e.g., interactions such as energy converted to electrical currents induced within support rings 430, at least partially blocking or shielding magnetic fields between magnets 414 and conductors 448, and the like.

In the example shown, stator tube assembly 420 is configured to be disposed within stator housing 406. In some examples, hollow body 221 may be a substantially cylindrical hollow body having a first radial thickness T1 along a first length L1 and a second radial thickness T2 along a second length L2, the second radial thickness T2 being greater than the first radial thickness T1. In some examples, the first length L1 may comprise a plurality of lengths separated by one or more second lengths L2, e.g., first length L1 may be segmented as illustrated in FIG. 4 (e.g., L1=L1D+L1E, and L2=L2D+L2M+L2E)

In some examples, stator tube assembly 420 may be configured to minimize or have a reduced radial thickness T1 at portions of the longitudinal length of electric machine 400 that are electrically and/or magnetically "active," e.g., proximate to appreciable electric and/or magnetic fields from magnets 414 and conductors 448 such as at L1D and LE in the example shown. In other words, first length L1 of hollow body 221 may include one or more lengths proximate to electric/magnetic fields of magnets 414 and conductors 448. The other portions of the longitudinal length of hollow body 221, e.g., second length L2, may include one or more lengths that are not proximate to electric/magnetic fields of magnets 414 and conductors 448. In some examples, the radial thicknesses of multiple segments of second length L2 may be the same, or differ from each other, e.g., the L2D and L2E portions of second length L2 may have a third radial thickness of T3 (not shown) that may be greater than T1 and different from T2 of the L2M portion of second length L2. In other words, hollow body 221 may be configured to reduce or minimize the radial distance between magnets 414 and conductors 448 via hollow body 221 being thinner in those portions of its longitudinal length (e.g., first length L1 portions), while other portions of the longitudinal length of hollow body 221 (e.g., second length L2 portions) may be configured to increase the stiffness and/or buckle resistance of stator tube assembly 420 and/or hollow body 221 (e.g., relative to a stator tube having first radial thickness T1 for its entire longitudinal length), e.g., via the increased radial thicknesses of the other portions of its length.

In some examples, the number and thicknesses of portions of first length L1 and portions of second length L2 of hollow body 221 may depend on the design of stator 402 and rotor assembly 404. In the example shown, electric machine 400 may be symmetric about radial axis B (axis B is illustrated as a broken dashed line for the sake of clarity of elements illustrated within electric machine 400). In some examples, conductors 448 on side D of electric machine may be operated/driven independently from conductors 448 on side E of electric machine 400. Magnets 414 on side D may interact with conductors 448 on side D independently of magnets 414 and conductors on side E. For example, if one or more conductors 448 or magnets 414 on side D of electric machine 400 fail such that conductors 448 and magnets 414 on side D are not able to convert between electrical and mechanical energy, e.g., via rotating rotor core 412, the magnets 414 and conductors 468 on side E may still function and not be susceptible to the same cause of failure on side D. Because of the design of the example shown, hollow body 221 may have an increased radial thickness at either end and for a portion of its middle, e.g., because those portions are not proximate to appreciable magnetic/electric fields that couple energy between conductors 448 and magnets 414.

In some examples, electric machine 400 may not be symmetric about a radial axis, e.g., radial axis B in the example shown, and the middle portion of its length may include magnets 414. For example, first length L1 of hollow body 221 having first radial thickness T1 may accordingly include the middle portion, and the second length L2 of stator tube assembly 420 having thickness second radial T2 may include only one or both end portions of the longitudinal length of hollow body 221.

In some examples, the radial thickness of one or more portions of second length L2 may be integral with stator tube assembly 420. For example, FIG. 4 illustrates stator tube assembly 420 including an increased radial thickness T2 that is integral with hollow body 221 of stator tube assembly 420. In some examples, hollow body 221 may have material removed or thinned to reduce its radial thickness to T1 to form length L1.

In some examples, the radial thickness of one or more portions of second length L2 may include a separate support structure that is adjacent to an inner surface 422 of hollow body 221, e.g., support rings 430. For example, in the example shown, second portions L2E and L2D have a radial thickness including the radial thickness of hollow body 221, e.g., T1 as shown, and the radial thickness of support rings 430. In some examples, support rings 430 may be configured to be disposed within the cavity defined by hollow body 221, e.g., rotor cavity 424, and support rings 430 may be configured to be adjacent to surface 422. Support rings 430 may be adjacent to surface 422 via being in contact with inner surface 422, and in other examples, support rings 430 may be adjacent to surface 422 of hollow body 221 by being radially within and spaced away from surface 422 by a separation distance. For example, the separation distance may be a maximum expansion or radial buckle distance of hollow body 221 when the fluid within stator cavity 410 is at an increased pressure.

The second radial thickness T2 of hollow body 221 is configured to increase the stiffness and/or buckle resistance of stator tube assembly 420 and/or hollow body 221. For example, the increased radial thickness T2 of second length L2 may increase the amount of a pressure differential between stator cavity 410 and rotor cavity 424 that hollow body 221 is able to withstand without failing and/or buckling, or at least without buckling and/or compressing greater than a threshold amount. For example, there may be a greater radially inwards pressure on hollow body 221 from a cooling fluid within stator cavity 410. In some examples, stator tube assembly 420 includes an increased radial thickness along several portions of second length L2, e.g., a radial thickness T3 at L2D and L2E corresponding to the radial thickness of hollow body 221 and the radial thickness of support rings 430, and L2M having a radial thickness T2.

In some examples, the increased radial thickness of second length L2 (e.g., L2D, L2M, and L2E) may be configured to increase the buckle resistance of stator tube assembly 420 and/or hollow body 221 during certain conditions, e.g., increased pressure conditions of electric machine 400 such as during a cold start. For example, during start-up of electric machine 400, the cooling fluid within stator cavity 410 may be relatively cool and have a relatively higher viscosity as compared to when the cooling fluid has received heat and is raised to higher temperature at which its viscosity is reduced, e.g., during operation of electric machine 400 after a start-up time. Stator tube assembly 420 may include second radial thicknesses larger than first radial thickness T1 along second length L2 configured to withstand the relatively greater radially inwards pressure from the cooling fluid during a cold start. In the example shown, hollow body 221 includes increased radial thickness T2 for a middle portion, e.g., L2M, of second length L2 and increased radial thicknesses (which may be both larger than T1 and different from T2) at end portions, e.g., L2D and L2E, of second length L2 via support rings 430.

In some examples, stator tube assembly 420, via the increased radial thickness of second length L2, may be configured to, as compared with a stator tube having only the first radial thickness T1 along its entire longitudinal length, increase the stiffness and buckle resistance, and reduce the amount of breaking, cracking, failing, buckling, and/or bending, at any portion of stator tube assembly 420 and/or hollow body 221, e.g., along at least portions of first length L1 having radial thickness T1 as well as along second length L2. Additionally, stator tube assembly 420, via the increased radial thickness of second length L2, may be configured to reduce leaking from stator cavity 410, e.g., to reduce fluid communication between stator cavity 410 and rotor cavity 424. For example, the second length L2 having an increased radial thickness relative to the first length L1 may be configured to stiffen and/or support the ends of hollow body 221 to reduce or eliminate bending/buckling of hollow body 221 about seals 428, e.g., via support rings 430.

In some examples, stator tube assembly 420 may be configured to be press and/or interference fit within stator housing 406. In some examples, hollow body 221 may be configured to be press fit between a support ring 430 and stator housing 406. In some examples, a stator tube assembly 420 with an increased radial thickness T2 at the ends of its longitudinal length that is integral with hollow body 221 may make assembly, e.g., press fit assembly and/or disassembly difficult. In some examples, increasing the effective radial thickness at the end portions of hollow body 221 via a separate component, such as support rings 430, may reduce the complexity and/or difficulty of assembling electric machine 400. In some examples, stator tube assembly 420 includes a beveled surface, such as illustrated and described below with reference to FIG. 8. For example, the outer radial surface of a portion of one or both ends of hollow body 221 may be beveled to have a radially inwards slope and/or curve. The beveled edges may be configured to allow hollow body 221 to be inserted and/or press fit between stator housing 406 and support ring 430, or to allow stator tube assembly 420 to be press fit within stator housing 406, e.g., with less force and/or without damaging seals 428 of stator housing 406.

Figure 5:
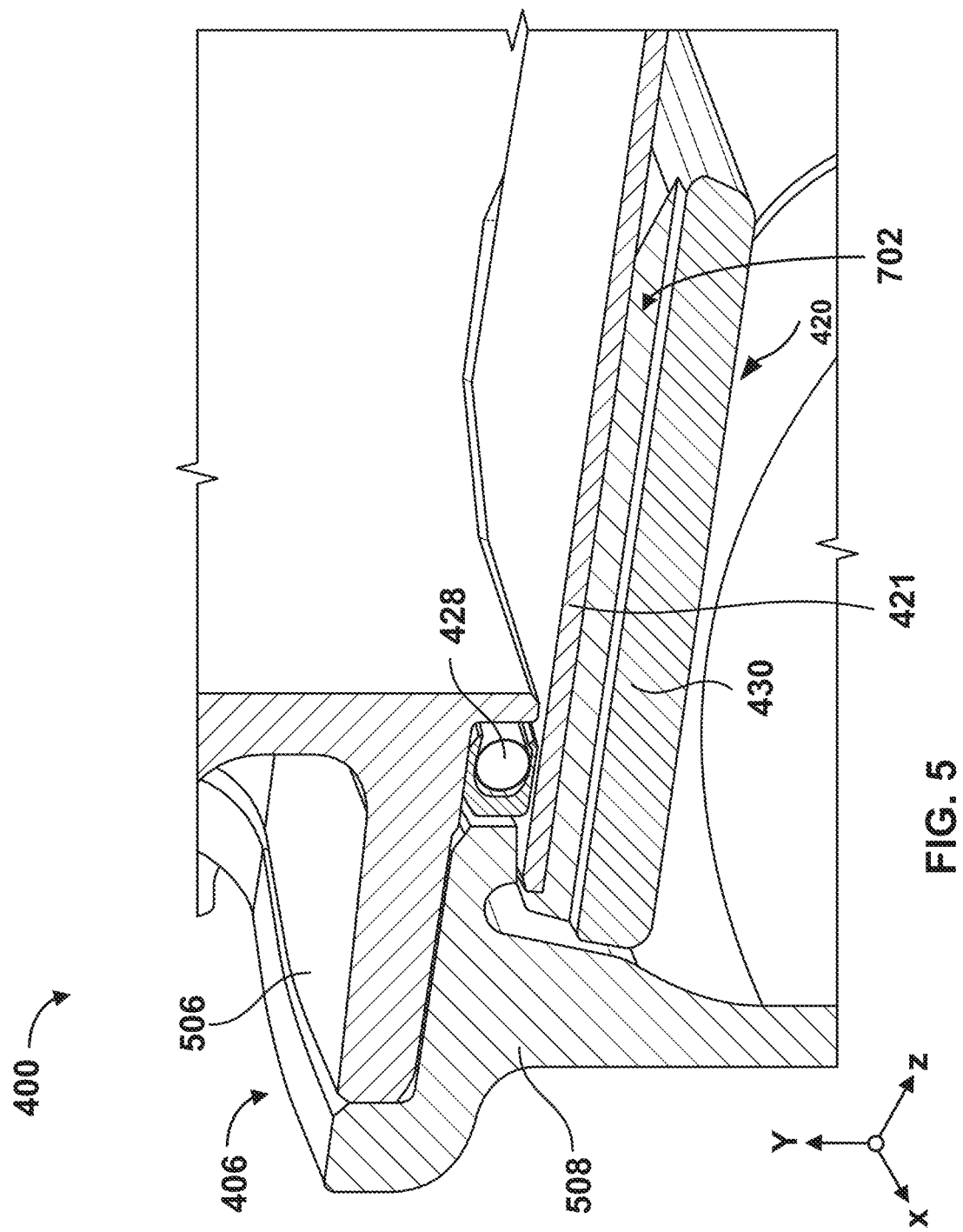
FIG. 5 is a perspective view of a portion of an example electric machine including a support ring and stator tube.
Figure 6:
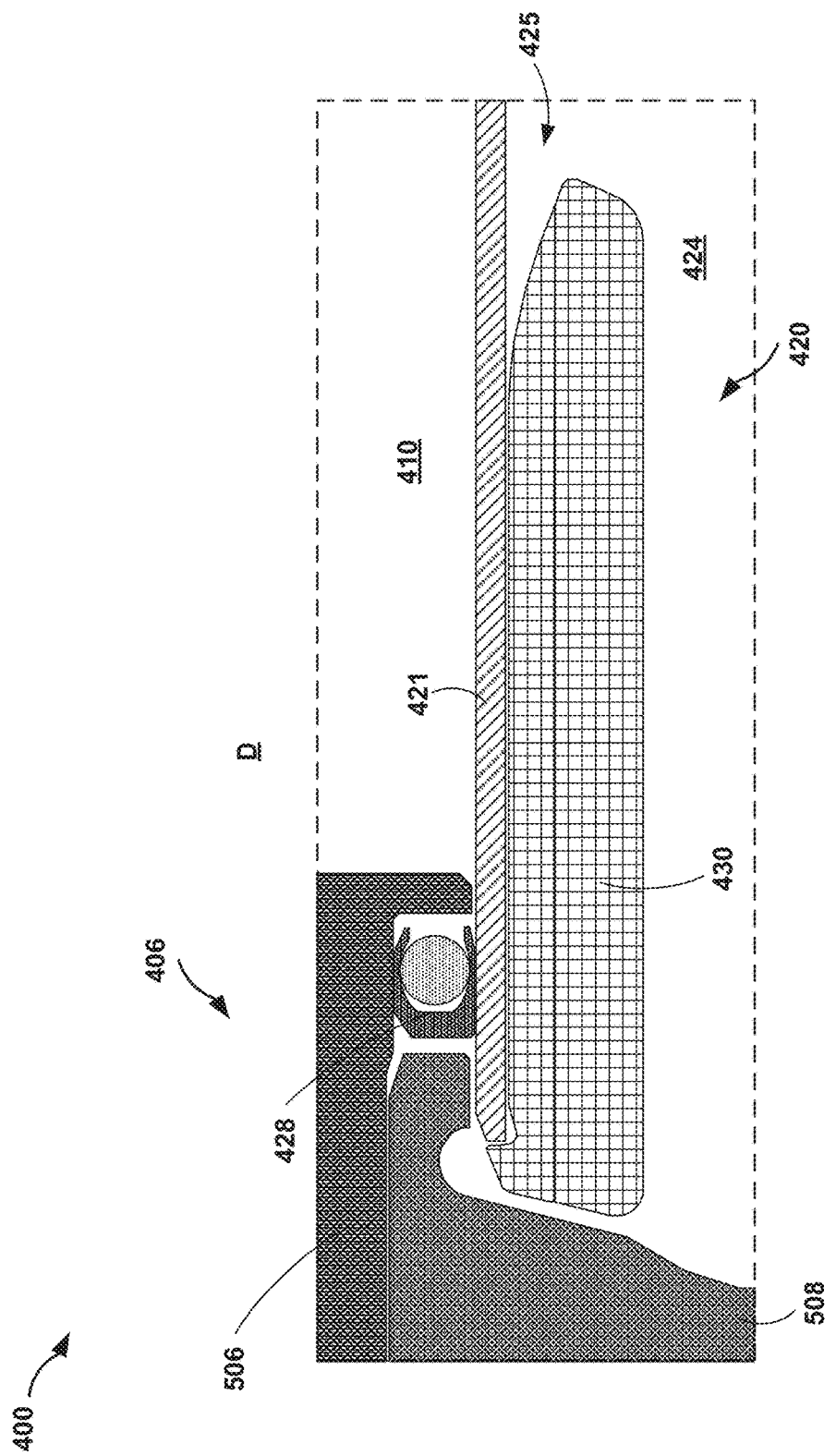
FIG. 6 is a cross-sectional view of a portion of an example electric machine including a support ring and stator tube.

FIGS. 5 and 6 are, respectively, a perspective view and a cross-sectional view of a portion of an example electric machine 400 including stator tube assembly 420, e.g., support ring 430 and hollow body 421, and are described concurrently below. In the examples shown, the portion of electric machine 400 illustrated correspond to an end portion of side D of electric machine 400. In the examples shown, stator housing 406 includes stator housing 506 and end lid 508, and support ring 430 may be configured to be placed or positioned within stator housing 406, e.g., within end lid 508 and stator housing 506.

Hollow body 421 housing may be configured to be press fit between the first support ring 430 and stator housing 406, e.g., via axially (longitudinally) moving one or both of the end lid of stator housing 406 and hollow body 421 towards each other in alignment such that hollow body 421 is advanced towards the end of stator housing 406 (e.g., in the negative z-direction in the example shown) between support ring 430 and stator housing 406. In other words, at least a portion of hollow body 421 having a radial thickness less than or equal to the first radial thickness T1 may be press fit between a support ring 430 and stator housing 406, effectively increasing the radial thickness of hollow body 421 for that portion of its length.

In some examples, the stator tube assembly 420 may be configured to be press fit within stator housing 406, or hollow body 221 may be configured to be press fit between support rings 430 and stator housing 406, with any suitable interference fit pressure. For example, stator tube assembly 420 may be configured to be press fit within stator housing 406, or hollow body 221 may be configured to be press fit between support rings 430 and stator housing 406, with an interference fit pressure configured to reduce and/or eliminate motion and/or rattling of support rings 430, e.g., and reduce wear and/or damage to hollow body 221 via rubbing of support rings 430 against inner surface 422. In some examples, stator tube assembly 420 may be configured to be press fit within stator housing 406, or hollow body 221 may be configured to be press fit between support rings 430 and stator housing 406, with an assembly load of less than or equal to a threshold force in the axial direction and/or with an assembly stress of less than or equal to a threshold pressure.

Once stator tube assembly 420 is press fit within stator housing 406, or hollow tube 421 is press fit between a first support ring 430 and stator housing 406, on one side (e.g., side D in the example described above, but it may be either side D or E first), rotor assembly 404 may be inserted into stator tube assembly 420, e.g., into rotor cavity 424. Stator tube assembly 420 may be further configured to then be press fit within stator housing 406, or hollow tube 421 is further configured to then be press fit between a second support ring 430 and stator housing 406, on a second side, e.g., side E in the example shown.

In the example shown, stator housing 406 includes seals 428. Seals 428, stator housing 406, hollow body 421, and support rings 430 may be configured to provide a seal force of greater than or equal to a threshold seal force. Seals 428 may be spring seals, o-rings, lip seals, or any suitable seal. In some examples, one or both of the longitudinal ends of stator tube assembly 420 and/or hollow body 421 include a slope, bevel, and/or chamfered edge configured to allows the housing to be inserted between stator housing 406 and support rings 430 without damaging seals 428, e.g., during press fitting of stator tube assembly 420 and/or hollow body 421 (the slope more clearly shown in FIG. 8 below).

Figure 7:
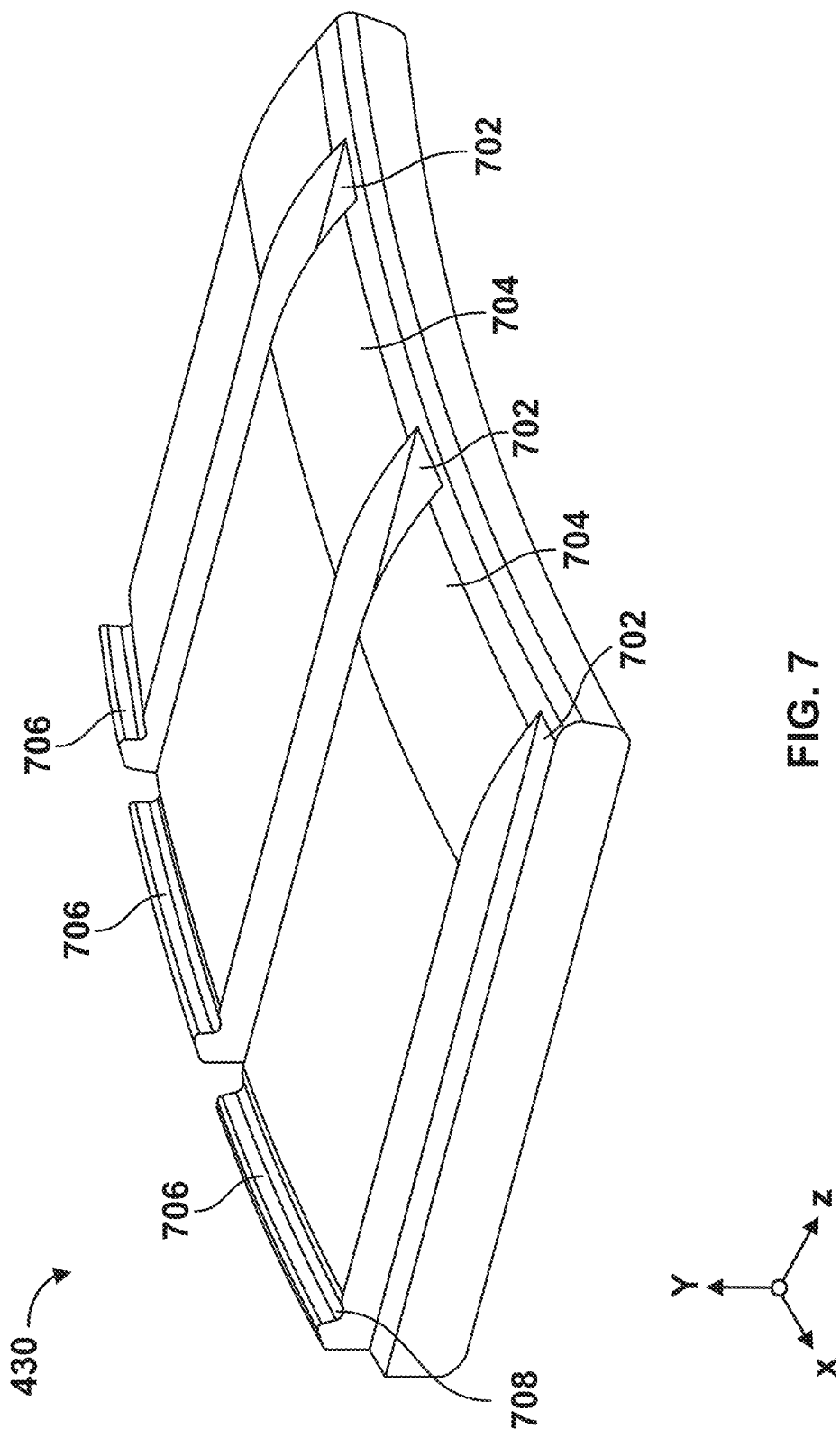
FIG. 7 is a perspective view of a portion of an example support ring.
Figure 8:
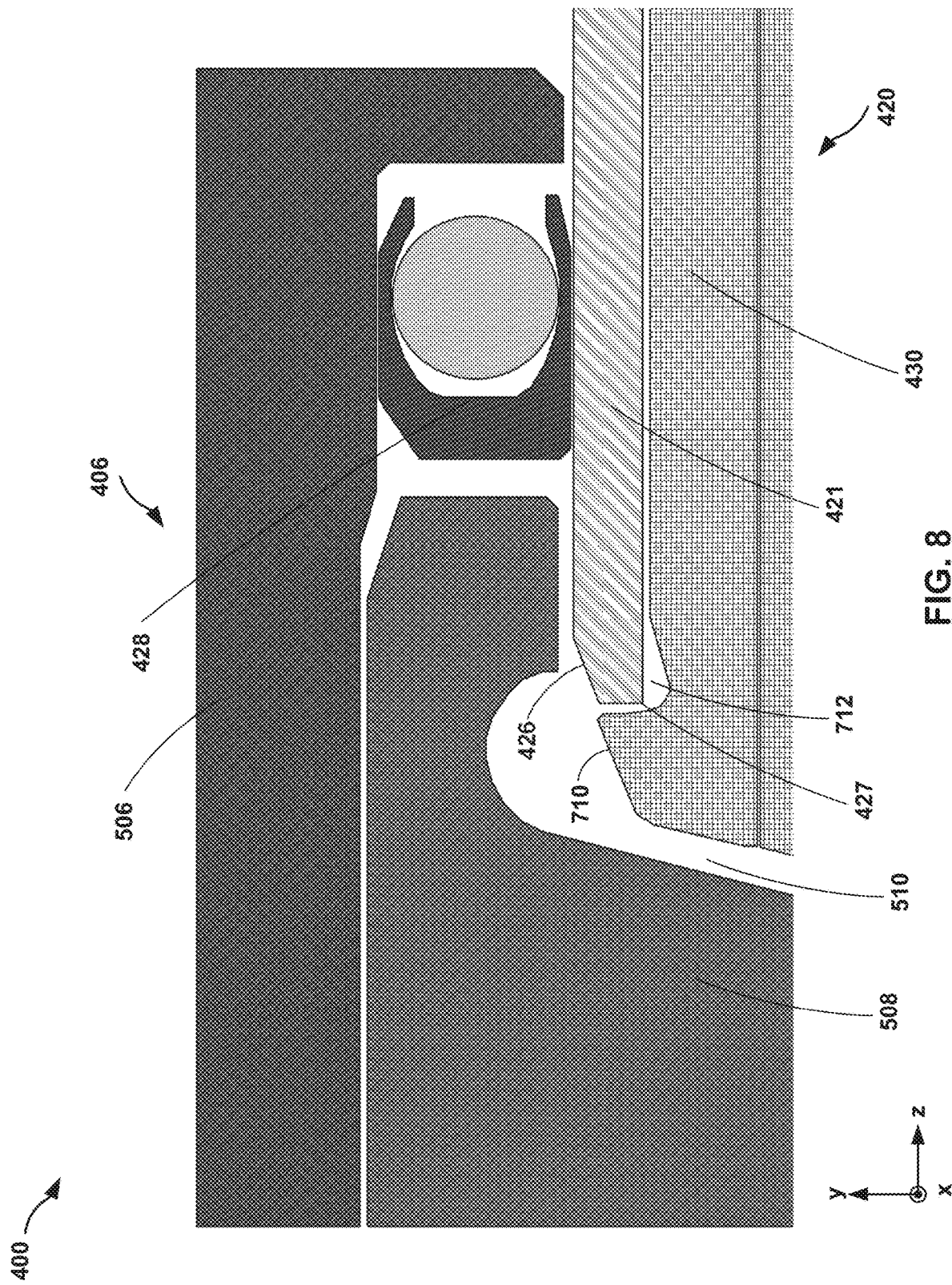
FIG. 8 is a cross-sectional view of a portion of an example electric machine including a support ring and stator tube.

FIG. 7 is a perspective view of a portion of an example support ring 430. FIG. 8 is a cross-sectional view of a portion of an example electric machine 400 including a stator tube assembly 420, e.g., support ring 430 and hollow body 421, and is described concurrently with FIG. 7.

In the example shown, support ring 430 includes channels 702, relief surface 704, stop edge 706, and recess 708. Support ring 430 may also include a sloped, beveled, and/or chamfered stop-edge surface 710 (illustrated in FIG. 8 below) configured to allow support ring 430 to be inserted and/or positioned within stator housing 406 without damaging a seal 428 of stator housing 406.

In some examples, support ring 430 is a circumferential ring about the z-axis, e.g., a longitudinal axis, with a curvature such that support ring 430 is configured to be disposed within rotor cavity 424 of electric machine 400 and adjacent to inner surface 422 of stator tube assembly 420, e.g., inner surface 422 of hollow body 421. In other examples, support ring 430 may be a portion of a circumferential ring, e.g., having a circumferential width that is less than a full revolution about the longitudinal axis. For example, electric machine 400 may include one or more support rings 430 on a single end, e.g., end D, and each support ring 430 would comprise a circumferential segment of a full revolution about the longitudinal axis. In some examples, there may be zero gap between support ring 430 segments, and in other examples there may be a circumferential gap between support ring 430 segments.

Support ring 430 may be made of an electrically insulating material or a material having a relatively low electrical conductivity, e.g., a ceramic or ceramic fiber material, a glass or glass fiber material, a carbon fiber material, a composite including any or all of the above materials and additional plastics, polymers, resins, epoxies, and the like. In some examples, support ring 430 may be made of an electrically conducting material, e.g., a metal.

In the example shown, support ring 430 includes channels 702. In some examples, support ring 430, whether circumferentially segmented or a circumferentially continuous ring, may include one channel 702 or a plurality of channels 702. Channels 702 are configured to provide a fluid communication between rotor cavity 424 and drainage slot 510 of stator housing 406 or end lid 508 (illustrated in FIG. 8 below). Channels 702 are configured to be in fluid communication between rotor cavity 424 and drainage slot 510, e.g., to allow any fluid and/or moisture within rotor cavity 424 to exit rotor cavity 424. For example, electric machine 400 may operate in humid environmental conditions, and humid air may enter rotor cavity 424 and water may condense within rotor cavity 424. Additionally, other fluids may build up within rotor cavity 424, such as cooling oil or fluid from other portions of rotor assembly 404, cooling oil or fluids from stator 402, bearing oil and/or lubricants, or the like, e.g., via small leaks or failing seals. Such fluids may build up along inner surface 422 of stator tube assembly 420, e.g., via air flow within rotor cavity 424 due to the rotation of rotor assembly 404. Without channels 702, such fluids may build up at the interface between support rings 430 and surface 422, until an amount of fluid has built up a radial thickness from surface 422 such that the fluid may run over the inner surface of support ring 430 towards the end of electric machine 400 and to drainage slot 510. In some examples, some of the built up fluid may not have a path to drainage slot 510 (e.g., in the absence of channels 702), e.g., fluid that has collected in volume/area 425 illustrated in FIG. 6 above. In some examples, channels 702 are configured to reduce and/or eliminate the build-up or collection of such fluids at stator ring 430 and provide a fluid path for the fluids to reach drainage slot 510.

In the example shown, support ring 430 includes relief surface 704. Relief surfaces 704 may be a single relief surface 704 with circumferential gaps due to channels 702, or may be considered as a plurality of surface relief surfaces 704 separated by channels 702. Relief surface 704 is a longitudinal portion of the radially outwards surface of support ring 430 that slopes and/or curves radially inwards from surface 422 of stator tube assembly 420 as a function of longitudinal distance in a direction from the longitudinal end of electric machine 400 at which support ring 430 is disposed towards the opposing longitudinal end of electric machine 400, e.g., in the positive z-direction and the direction opposite stop edge 706. Relief surface 704 is configured to radially support hollow body 421 while allowing the hollow body 421 to compress radially inwards gradually as a function of longitudinal position in a direction towards the middle of the longitudinal length of the housing. In other words, relief surface 704 is configured to reduce and/or eliminate stress points along relief surface 704, e.g., due to angled edges, and provide a gradual terminus to the inner end of support ring 430.

For example, an "instantaneous" change of radial direction of the outer surface of support ring 430, such as at a right-angled edge or even the intersection of a sloped edge, may cause a stress point on surface 422 at the edge. A compressive force on stator tube assembly 420, e.g., due to increased pressure within stator cavity 410, may cause hollow body 421 to deform (e.g., plastic deformation) or even shear due to the significantly increased force per area at the stress point. Relief surface 704 is configured to remove stress points for a longitudinal length, and allow stator tube assembly 420, e.g., hollow body 421, to radially compress as a function of longitudinal position with reduced/eliminated stress points for a longitudinal length and a radial length, e.g., corresponding to the curvature of relief surface 704. In some examples, the curvature of relief surface 704 is configured to correspond to a threshold amount of pressure differential between stator cavity 410 and rotor cavity 424, e.g., corresponding to a threshold amount of compressive force on stator tube assembly 420 and a threshold amount of compression and/or longitudinal pull out of hollow body 421 from the press fit between support ring 430 and stator housing 406 due to radial compression of stator tube assembly 420 and/or hollow body 421.

In the example shown, support ring 430 includes stop edge 706. Stop edge 706 is configured to prevent the hollow body 421 from moving in a longitudinal direction towards longitudinal end of the hollow body 421, e.g., in the negative z-direction as shown. For example, stop edge 706 may be configured to define the amount of longitudinal distance support tube assembly 420 may be inserted into stator housing 406, and stop edge 706 may be configured to reduce movement of stator tube assembly 420 in the longitudinal direction, e.g., when electric machine 400 is assembled. Stop edge 706 may be configured to prevent hollow body 421 from contacting an end portion of stator housing 406, e.g., an end portion of an inner surface of end lid 508. Additionally, stope edge 706 may be configured to prevent and/or reduce movement of support ring 430 in the longitudinal direction towards the other end of electric machine 400, e.g., in the positive z-direction. For example, when assembled, hollow body 421 may be longitudinally held in place by stop edges 706 on both ends, e.g., sides D and E, of electric machine 400, in addition to the interference fit of hollow body 421 between support rings 430 and stator housing 406.

In the example shown, support ring 430 includes recess 708. In some examples, recess 708 is configured to prevent an edge, corner, or lower edge 427 (illustrated in FIG. 8) of stator tube assembly 420 or hollow body 421 from contacting a sharp corner of support ring 430, e.g., to reduce/remove a stress point on the radially inwards and longitudinally outwards edge 427 of hollow body 421. For example, during assembly, if support ring 430 would otherwise include a right angle at stop edge 710, edge 427 may break, chip, deform, or otherwise be damaged during press fitting of stator tube assembly 420 and/or hollow body 421. Recess 708 is configured to reduce/eliminate breaking, chipping, deformation, or damage of hollow body 421, e.g., edge 427.

In the example shown, support ring 430 includes beveled surface 710. Beveled surface 710 is configured to allow support ring 430 to be inserted into, and/or removed from, stator housing 406 without damage seal 428 of stator housing 406. FIG. 8 also illustrates beveled surface 426 of hollow body 421. Beveled surface 426 comprises a slope and/or curve configured to allow stator tube assembly 420 and/or hollow body 421 to be inserted into, and/or removed from, stator housing 406 without damage seal 428 of stator housing 406.

In some examples, support ring 430 may have a radial thickness configured to increase the stiffness and/or buckle resistance of stator tube assembly 420 and/or hollow body 421 as well as reduce stresses between stator housing 406, hollow body 421, and support ring 430. For example, support ring 430 may have a durometer (or compressive compliance) configured to reduce stresses to any or all of stator housing 406, hollow body 421, and support ring 430 during press fitting and/or after assembly of electric machine 400.

Figure 9:
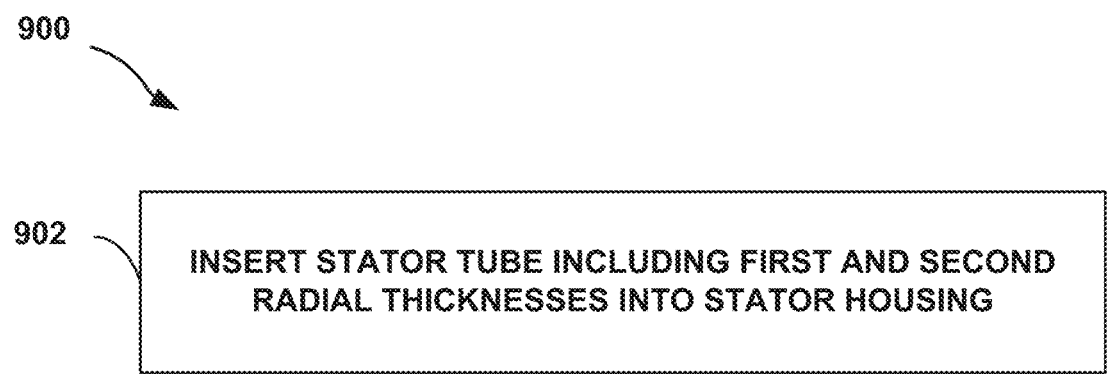
FIG. 9 is a flowchart of an example technique for making an electric machine including a stator tube.

FIG. 9 is a flowchart of an example technique 900 for making an electric machine including a stator tube. Although described with reference to electric machine 400, stator tube assembly 420, and support ring 430 of FIGS. 4-8, the technique may be used to form any suitable electric machine including a stator tube having first and second longitudinal lengths of differing radial thicknesses.

An electric machine fabricator, e.g., a person and/or machine, may inserting a stator tube assembly into a stator housing (902). For example, the electric machine fabricator may align, position, and advance a longitudinal portion of stator tube assembly 420 into one or both of end cap 508 and stator housing 506, 406. The stator tube assembly 420 may include hollow body 421 defining rotor cavity 424 and having a longitudinal length and a radial thickness. Hollow body 421 may be configured to be disposed within stator housing 406 and to separate rotor cavity 424 from a stator within the stator housing, e.g., conductors 448. Hollow body 421 may include a first radial thickness (e.g., T1) along a first portion of its longitudinal length (e.g., L1) and a second radial thickness (e.g., T2) along a second portion of its longitudinal length (e.g., L2), the second radial thickness being greater than the first radial thickness (e.g., T2>T1).

In some examples, at least a portion of the second radial thickness for at least a portion of the second portion of its longitudinal length (e.g., L2D and/or L2E) may include a support ring 430. That is, the increased thickness (e.g., relative to T1) at an end of stator tube assembly 420 may be a support ring 430.

Figure 10:
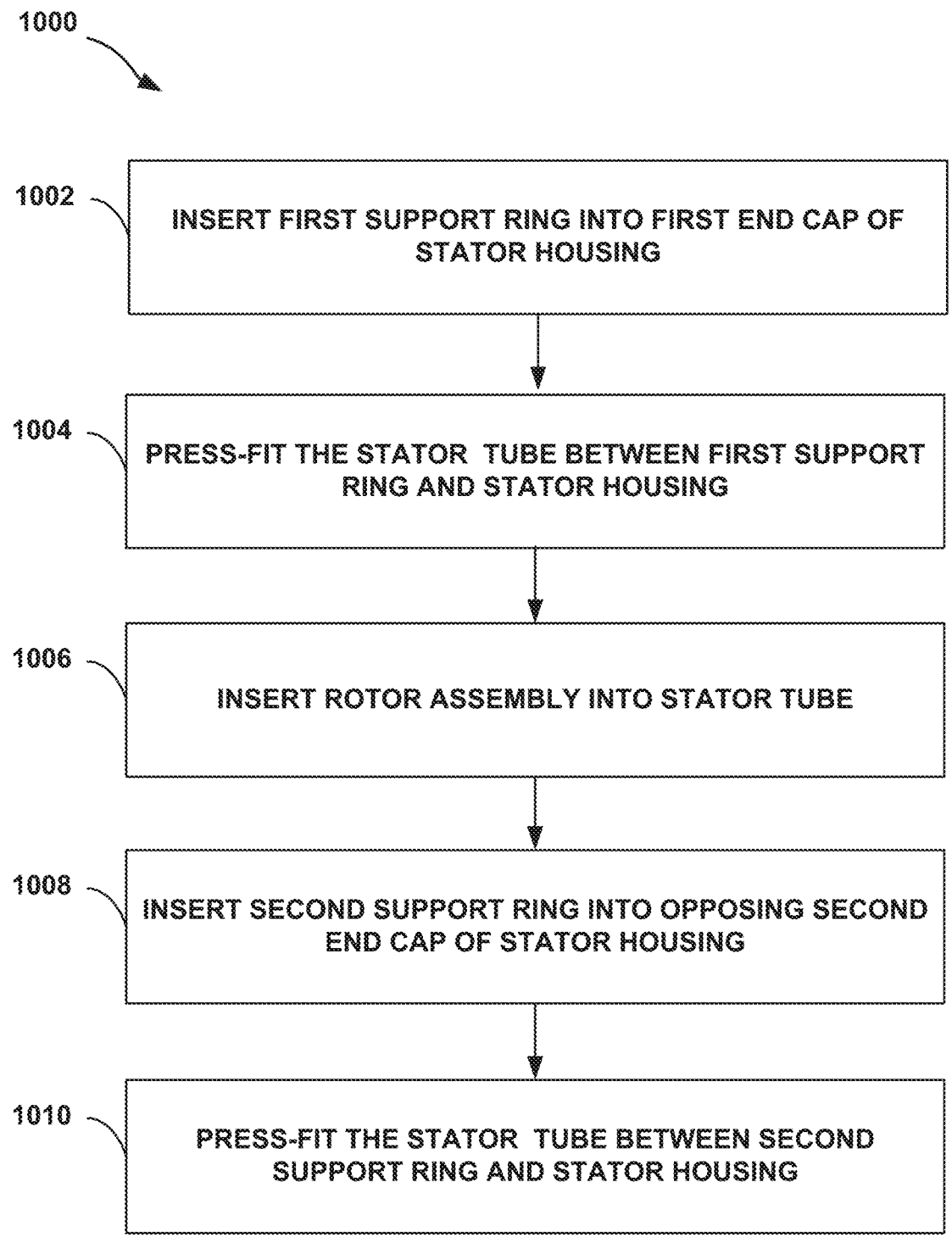
FIG. 10 is a flowchart of another example technique for making an electric machine including a stator tube.

FIG. 10 is a flowchart of another example technique 1000 for making an electric machine including a stator tube assembly. Although described with reference to electric machine 400, stator tube assembly 420, and support ring 430 of FIGS. 4-8, the technique may be used to form any suitable electric machine including a stator tube having first and second longitudinal lengths of differing radial thicknesses.

An electric machine fabricator, e.g., a person and/or machine, may insert a first support ring into a first end cap portion of a stator housing (1002). For example, the electric machine fabricator may align and position a first support ring 430 within stator housing 406 (e.g., stator housing 406 may comprise end cap 508 and/or stator housing 506).

The electric machine fabricator may press fit a stator tube hollow body between the first support ring and the stator housing 406 (1004). For example, the electric machine fabricator may press fit at least a portion of the second longitudinal length L2 (e.g., L2D) of hollow body 421 between first support ring 430 and stator housing 406, e.g., via axially (longitudinally) moving one or both of stator housing 406 (e.g., including end cap 508) and hollow body 421 towards each other in alignment such that a portion of hollow body 421 is advanced towards the longitudinal end of stator housing 406 between first support ring 430 and stator housing 406. In other words, at least a portion of hollow body 421 having a radial thickness less than or equal to the first radial thickness T1 may be press fit between first support ring 430 and stator housing 406, effectively increasing the radial thickness of hollow body 421 for that portion of its length.

In some examples, the electric machine fabricator may press fit hollow body 421 between support rings 430 and stator housing 406 with an interference fit pressure of less than or equal to a threshold pressure, or with any suitable interference fit pressure. For example, the electric machine fabricator may press fit hollow body 421 between support rings 430 (e.g., first support ring 430 and/or second support ring 430 described below at (1008)) and stator housing 406 with an interference fit pressure configured to reduce and/or eliminate motion and/or rattling of support rings 430, e.g., and reduce wear and/or damage to hollow body 421 via rubbing of support rings 430 against inner surface 422. In some examples, the electric machine fabricator may press fit hollow body 421 between support rings 430 and stator housing 406 with an assembly load of less than or equal to a threshold force in the axial direction. In some examples, the electric machine fabricator may press fit hollow body 421 support rings 430 and stator housing 406 with an assembly stress of less than or equal to a threshold assembly stress pressure.

In some examples, first support ring 430 is configured to be disposed within rotor cavity 424 and adjacent to an inner surface 422 along at least a portion of the second longitudinal length (e.g., L2E or L2D) of hollow body 421. In some examples, hollow body 421 includes a second radial thickness (T2) that comprises the first support ring 430, and first support ring 430 is configured to increase a buckle resistance of hollow body 421 and/or stator tube assembly 420.

An electric machine fabricator may insert a rotor assembly into the stator tube assembly (1006). For example, the electric machine fabricator may insert rotor assembly 404 into stator tube assembly 420 and into the rotor cavity 424 defined by hollow body 421. The electric machine fabricator may insert a second support ring into a second end cap portion of the stator housing (1008), e.g., as similarly described above with reference to the first support ring at (1002).

The electric machine fabricator may press fit the stator tube hollow body between the second support ring and the stator housing 406 (1010). For example, the electric machine fabricator may press fit at least a portion of the second longitudinal length L2 (e.g., L2E) of hollow body 421 between second support ring 430 and stator housing 406, e.g., via axially (longitudinally) moving one or both of the opposing end of stator housing 406 (e.g., including an opposing second end cap 508) and hollow body 421 towards each other in alignment such that the second portion of hollow body 421 is advanced towards the longitudinal end of the opposing end stator housing 406 between second support ring 430 and stator housing 406. In other words, at least a second portion of hollow body 421 housing having a radial thickness less than or equal to the first radial thickness T1 may be press fit between second support ring 430 and stator housing 406, effectively increasing the radial thickness of hollow body 421 for that portion of its length.

In some examples, second support ring 430 is configured to be disposed within rotor cavity 424 and adjacent to an inner surface 422 along the second portion of the longitudinal length (e.g., L2E or L2D) of hollow body 421. In some examples, hollow body 421 includes a second radial thickness (T2) that comprises the second support ring 430, and second support ring 430 is configured to increase a buckle resistance of hollow body 421 and/or stator tube assembly 420.

Figure 11:
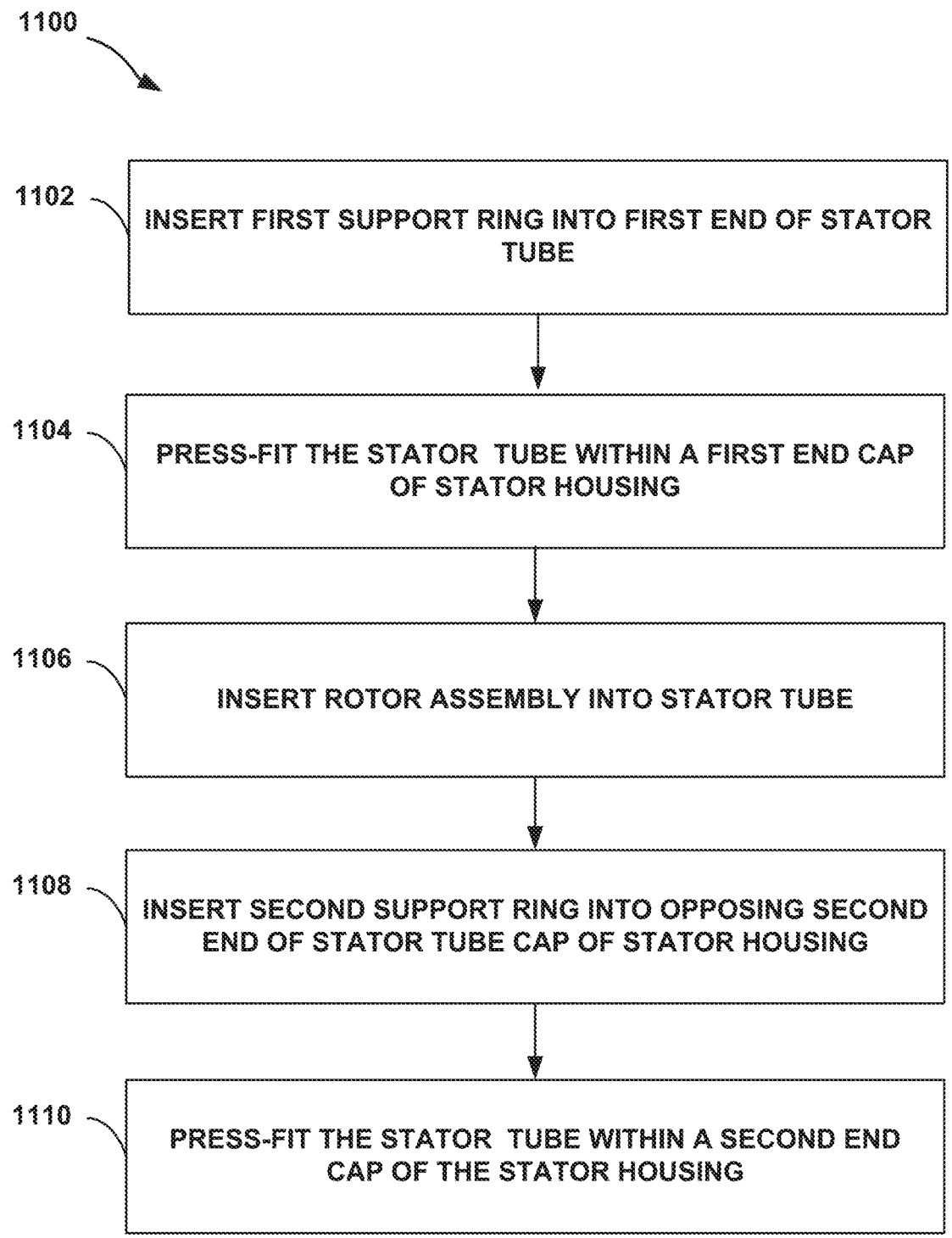
FIG. 11 is a flowchart of another example technique for making an electric machine including a stator tube.

FIG. 11 is a flowchart of another example technique 1100 for making an electric machine including a stator tube assembly. Although described with reference to electric machine 400, stator tube assembly 420, and support ring 430 of FIGS. 4-8, the technique may be used to form any suitable electric machine including a stator tube having first and second longitudinal lengths of differing radial thicknesses. Technique 1100 may be substantially similar to technique 1000 described above with the order of some operations switched, e.g., the support rings may be press fit within the stator tube/hollow body and then the stator tube/hollow body with the inserted support rings may be press fit within the stator housing for both ends, rather than inserting the support rings into stator housing end caps and inserting the stator tube/hollow body between the support rings and stator housing.

An electric machine fabricator, e.g., a person and/or machine, may press fit a first support ring into a cavity defined by a stator tube (1102). For example, the electric machine fabricator may press fit a first support ring 430 within hollow body 421.

The electric machine fabricator may press fit the stator tube within a stator housing (1104). For example, the electric machine fabricator may press fit the first end of hollow body 421 including the first support ring 430 into stator housing 406.

In some examples, the electric machine fabricator may press fit hollow body 421 within stator housing 406 and/or support rings 430 within hollow body 421 with an interference fit pressure of less than or equal to a threshold pressure, or with any suitable interference fit pressure. For example, the electric machine fabricator may hollow body 421 within stator housing 406 and/or support rings 430 within hollow body 421 with an interference fit pressure configured to reduce and/or eliminate motion and/or rattling of support rings 430, e.g., and reduce wear and/or damage to hollow body 421 via rubbing of support rings 430 against inner surface 422. In some examples, the electric machine fabricator may hollow body 421 within stator housing 406 and/or support rings 430 within hollow body 421 with an assembly load of less than or equal to a threshold force in the axial direction. In some examples, the electric machine fabricator may hollow body 421 within stator housing 406 and/or support rings 430 within hollow body 421 with an assembly stress of less than or equal to a threshold assembly stress pressure.

In some examples, first support ring 430 is configured to be disposed within rotor cavity 424 and adjacent to an inner surface 422 along at least a portion of the second longitudinal length (e.g., L2E or L2D) of hollow body 421. In some examples, hollow body 421 includes a second radial thickness (T2) that comprises the first support ring 430, and first support ring 430 is configured to increase a buckle resistance of hollow body 421 and/or stator tube assembly 420, as described above.

An electric machine fabricator may insert a rotor assembly into the stator tube assembly (1106), e.g., as described above at (1006). An electric machine fabricator may press fit a second support ring into a second end of the cavity defined by the stator tube (1108) similar to that described above at (1102), and the electric machine fabricator may press fit the stator tube within a second end of the stator housing (1110), similar to that described above at (1104). The following examples may illustrate one or more aspects of the disclosure:

Example 1: A stator tube assembly comprising: a hollow body defining a cavity and having a longitudinal length and a radial thickness, wherein the hollow body is configured to be disposed within a stator housing and to separate the cavity from a stator cavity within the stator housing, wherein the hollow body comprises a first radial thickness along a first portion of its longitudinal length and a second radial thickness along a second portion of its longitudinal length, the second radial thickness being greater than the first radial thickness.

Example 2: The stator tube of example 1, wherein the hollow body is configured to at least partially house a rotor assembly, wherein the first portion of the longitudinal length of the hollow body is proximate to an electrically or magnetically active longitudinal length of the rotor assembly.

Example 3: The stator tube of example 1 or example 2, wherein the second radial thickness is integral with the hollow body.

Example 4: The stator tube of any one of examples 2 and 3, wherein the second portion of the longitudinal length of the hollow body includes a portion of the middle length of the hollow body.

Example 5: The stator tube of example 4, wherein the second portion of the longitudinal length of the hollow body includes a portion of at least one longitudinal end of the hollow body.

Example 6: The stator tube of any one of examples 1 through 5, further comprising: a support ring configured to be disposed within the cavity and adjacent to an inner surface of the hollow body along the second portion of the longitudinal length of the hollow body, wherein the second radial thickness comprises the support ring, wherein the support ring is configured to increase a buckle resistance of the hollow body.

Example 7: The stator tube of example 6, wherein the support ring comprises a channel configured to be in fluid communication between the cavity and a drainage slot of the stator housing.

Example 8: The stator tube of example 6 or example 7, wherein the support ring comprises a stop edge configured to reduce movement of the hollow body in a longitudinal direction towards a longitudinal end of the hollow body.

Example 9: The stator tube of any one of examples 6 through 8, wherein the support ring is configured to be press fit within the cavity, wherein the hollow body with the support ring are configured to be press fit within the stator housing.

Example 10: The stator tube of any one of examples 6 through 9, wherein the support ring comprises a first longitudinal end proximate the first longitudinal end of the hollow body and a second longitudinal end opposite the first longitudinal end, wherein the radially outwards surface of the second longitudinal end of the support ring is configured to curve radially inwards from the inner surface of the hollow body and is configured to radially support the hollow body while allowing the hollow body to compress radially inwards gradually as a function of longitudinal position in a direction towards the middle of the longitudinal length of the hollow body.

Example 11: The stator tube of example 10, wherein the first longitudinal end of the hollow body comprises a slope configured to allow the hollow body to be inserted between the stator housing and support ring without damaging a seal of the stator housing.

Example 12: The stator tube of any of examples 1 through 11, wherein the hollow body is electrically non-conductive.

Example 13: The stator tube of any one of examples 10 through 12, wherein the hollow body comprises at least one of glass fibers or ceramic fibers, wherein the support ring comprises at least one of a metal or a polymer composite.

Example 14: A support ring comprising: at least one of metal or a polymer composite configured to be disposed within a cavity defined by a stator tube and adjacent to an inner surface of the stator tube along a portion of a longitudinal length of the stator tube for at least a portion of a circumference of the stator tube, wherein the support ring is configured to increase a buckle resistance of the stator tube, wherein the stator tube is configured to be inserted into a stator housing and to separate the cavity from a stator cavity within the stator housing.

Example 15: The support ring of example 14 further comprising a channel configured to be in fluid communication between the cavity and a drainage slot of the stator housing.

Example 16: The support ring of example 14 or example 15 further comprising a stop edge configured to reduce movement of the stator tube in a longitudinal direction towards the first longitudinal end of the stator tube.

Example 17: The support ring of any one of examples 14 through 16, wherein the support ring is configured to press fit the stator tube to the stator housing.

Example 18: The support ring of example 17 further comprising a first longitudinal end proximate the first longitudinal end of the stator tube and a second longitudinal end opposite the first longitudinal end, wherein the radially outwards surface of the second longitudinal end of the support ring is configured to curve radially inwards from the inner surface of the stator tube and is configured to radially support the stator tube while allowing the stator tube to compress radially inwards gradually as a function of longitudinal position in a direction towards the middle of the longitudinal length of the stator tube.

Example 19: A method of making an electric machine comprising: inserting a stator tube assembly into a stator housing, the stator tube assembly comprising: a hollow body defining the rotor cavity and having a longitudinal length and a radial thickness, wherein the hollow body is configured to be disposed within the stator housing and to separate the rotor cavity from the stator within the stator housing, wherein the hollow body comprises a first radial thickness along a first portion of its longitudinal length and a second radial thickness along a second portion of its longitudinal length, the second radial thickness being greater than the first radial thickness.

Example 20: The method of example 19, wherein inserting the stator tube into the stator housing comprises press fitting a support ring within the cavity, wherein the support ring configured to be disposed within the rotor cavity and adjacent to an inner surface of the hollow body along the second portion of the longitudinal length of the hollow body, wherein the second radial thickness comprises the support ring, wherein the support ring is configured to increase a buckle resistance of the hollow body, wherein the hollow body with the support ring are configured to be press fit within the stator housing.

Various examples have been described. These and other examples are within the scope of the following claims.

What is claimed is:

1. A support ring comprising:
   at least one of metal or polymer composite configured to be disposed within a cavity defined by a stator tube and adjacent to an inner surface of the stator tube along a portion of a longitudinal length of the stator tube for at least a portion of a circumference of the stator tube; and
   a channel configured to be in fluid communication between the cavity and a drainage slot of a stator housing,
   wherein the support ring is configured to increase a buckle resistance of the stator tube, wherein the stator tube is configured to be inserted into the stator housing and to separate the cavity from a stator cavity within the stator housing.

2. The support ring of claim 1 further comprising a stop edge configured to reduce movement of the stator tube in a longitudinal direction towards a first longitudinal end of the stator tube.

3. The support ring of claim 1, wherein the support ring is configured to press fit the stator tube to the stator housing.

4. The support ring of claim 3 further comprising a first longitudinal end proximate the first longitudinal end of the stator tube and a second longitudinal end opposite the first longitudinal end, wherein the radially outwards surface of the second longitudinal end of the support ring is configured to curve radially inwards from the inner surface of the stator tube and is configured to radially support the stator tube while allowing the stator tube to compress radially inwards gradually as a function of longitudinal position in a direction towards a middle of the longitudinal length of the stator tube.

* * * * *